United States Patent
Pfeiler

(10) Patent No.: US 7,267,258 B2
(45) Date of Patent: Sep. 11, 2007

(54) METHOD FOR METALLICALLY CONNECTING RODS BY OSCILLATING FRICTION WELDING

(75) Inventor: Hans Pfeiler, Leoben (AT)

(73) Assignee: voestalpine Schienen GmbH, Leoben (AT)

(*) Notice: Subject to any disclaimer, the term of this patent is extended or adjusted under 35 U.S.C. 154(b) by 0 days.

(21) Appl. No.: 11/092,565

(22) Filed: Mar. 29, 2005

(65) Prior Publication Data
US 2005/0224559 A1    Oct. 13, 2005

Related U.S. Application Data

(63) Continuation of application No. PCT/AT03/00281, filed on Sep. 24, 2003.

(30) Foreign Application Priority Data
Sep. 30, 2002    (AT) .............................. A 1476/2002

(51) Int. Cl.
B23K 20/12    (2006.01)
B23K 31/02    (2006.01)

(52) U.S. Cl. ...................... 228/112.1; 228/2.1; 228/113

(58) Field of Classification Search ...................... None
See application file for complete search history.

(56) References Cited

U.S. PATENT DOCUMENTS 3,464,616 A * 9/1969 Stamm ........................ 288/2.3
3,564,703 A   2/1971 Kiwalle
3,581,969 A   6/1971 Bodine
3,732,613 A * 5/1973 Steigerwald ............. 228/112.1
3,752,998 A * 8/1973 Stripling et al. ............ 250/234
3,860,468 A * 1/1975 Scherer ...................... 156/73.5
4,060,190 A * 11/1977 Paolini ....................... 228/2.3
4,247,346 A * 1/1981 Maehara et al. ........... 156/73.5
4,470,868 A   9/1984 MacLaughlin et al.
5,165,589 A   11/1992 Nied et al.

(Continued)

FOREIGN PATENT DOCUMENTS

DE        3433519 C1 *  1/1986

(Continued)

OTHER PUBLICATIONS

Will W. I., *Swarka metallow treniem*(Friction Welding of Metals), Maschinostroenie, 1970, p. 106, section 1, Fig. 51.

(Continued)

*Primary Examiner*—Lynne R. Edmondson
(74) *Attorney, Agent, or Firm*—Greenblum & Bernstein, P.L.C.

(57) ABSTRACT

The process for metallically connecting the faces of rods. Axially normal dressing at least two rod free ends, then placing the cross sectional surfaces of the rod free ends one against another under pressure. Oscillating the two rod free ends in the opposite direction to one another, whereby frictional heat is generated on the contact surfaces of the rod free ends. Further, when the conditions for a metallic connection are met, the rod free ends are axially aligned and the pressurization of the cross sectional areas is increased. Resulting in the rod free ends being connected to one another over the entire surface. The instant abstract is neither intended to define the invention disclosed in this specification nor intended to limit the scope of the invention in any way.

20 Claims, 1 Drawing Sheet

U.S. PATENT DOCUMENTS

| | | |
|---|---|---|
| 5,237,892 A | 8/1993 | Fry |
| 5,697,545 A | 12/1997 | Jennings et al. |
| 6,029,727 A | 2/2000 | Nomura et al. |
| 6,105,849 A | 8/2000 | Mochizuki et al. |
| 6,357,506 B1 | 3/2002 | Nomura et al. |
| 2004/0094604 A1* | 5/2004 | Halley et al. ............ 228/112.1 |
| 2004/0256439 A1* | 12/2004 | Pfeiler ..................... 228/112.1 |

FOREIGN PATENT DOCUMENTS

| | | |
|---|---|---|
| DE | 19807457 | 9/1998 |
| DE | 19938099 | 2/2001 |
| EP | 0707919 | 4/1996 |
| EP | 0920948 | 6/1999 |
| FR | 2738763 | 3/1997 |
| GB | 1293532 | 7/1968 |
| GB | 1293531 | 10/1972 |
| GB | 1324431 | 7/1973 |
| GB | 1481215 | 7/1997 |
| JP | 6312279 | 11/1994 |
| JP | 2000301364 A * | 10/2000 |
| JP | 2002-153975 | 5/2002 |
| SU | 145120 | 4/1960 |
| SU | 329700 | 3/1970 |
| SU | 529921 | 9/1976 |
| SU | 1002120 | 3/1983 |
| SU | 1260144 | 9/1983 |
| SU | 1098721 | 6/1984 |
| WO | WO92/10328 | 6/1992 |
| WO | WO 02/26437 | 4/2002 |

OTHER PUBLICATIONS

English language translation of Soviet Union 1002120.
Patent Abstracts of Japan JP 2002153975.
Patent Abstracts of Japan JP 6312279.
English language translation of Soviet Union 145120.
English language translation of Soviet Union 329700.
English language translation of Soviet Union 1098721.
Pages 146-149 of 1987 Reference Book (in Russian) entitled Friction Welding.
English language traslation of pp. 146-149 of 1987 Reference Book (in Russian) entitled Friction Welding.

* cited by examiner

METHOD FOR METALLICALLY CONNECTING RODS BY OSCILLATING FRICTION WELDING

CROSS-REFERENCE TO RELATED APPLICATIONS

The present invention is a Continuation of International Patent Application No. PCT/AT2003/000281 filed Sep. 24, 2003, and claims priority under 35 U.S.C. § 119 of Austrian Patent Application No. A 1476/2002 filed Sep. 30, 2002. Moreover, the disclosure of International Patent Application No. PCT/AT/2003/000281 is expressly incorporated by reference herein in its entirety.

BACKGROUND OF THE INVENTION

1. Field of the Invention

The invention relates to a method for metallically connecting the faces of rods, optionally of profiled rods, e.g., rails, with great longitudinal extension, directed to friction welding.

2. Discussion of Background Information

In principle, fusion-welding methods and hot-pressure welding methods, namely friction welding methods can be used to connect the ends of rods. In assembly technology, friction welding methods can have economic and qualitative advantages; however, experts think their use is not expedient for some types of joints, e.g., joining the faces of profiled rods.

With friction welding of parts, two surfaces to be joined are pressed together and moved relative to one another, whereby frictional heat is generated and the part areas are heated. Through the heating of the areas near to the friction surfaces, a plasticilation of the material therein occurs, so that after the completion of the relative movement and an increased pressing apart of the parts, a metallic connection occurs through solid diffusion.

If it can be done at all, rods with great longitudinal extension and rods profiled in cross section can be produced axially aligned only with extraordinary effort directed to a rotational friction welding method, whereas a profile-aligned connection is an unsolved problem.

With a connection of the rods by a linear friction welding or an orbital friction welding, it is important to achieve a precise axially aligned alignment of the same in the connection area. In particular with a friction welding of profiled rods, such as rails, it is additionally of greatest importance to connect the cross-sectional surfaces with precision fit.

A method and a device for the friction welding of railway rails and comparable, similar carrier profiles is known from DE 19807457 A1, in which an intermediate piece is moved in linear or orbital oscillation between the rail ends to be connected and the rail ends are pressed toward one another onto the intermediate piece in order to generate the heat necessary for welding through frictional heat. Such a friction welding method has the advantage that an axial alignment of the stationary rails during friction welding can be achieved irrespective of the method; however, a formation of two connection surfaces per connection area is disadvantageous.

All the methods according to the prior art also have the disadvantage that a bending of the free ends of the rods, can bring their faces to be connected out of parallelism and thus impede a friction heating and plasticization of the material close the surface across the entire surface.

SUMMARY OF THE INVENTION

The present invention improves the method which profiled rods can be metallically connected by the faces through friction welding in an axially aligned manner over the surface, A generic friction welding method presents an axially normal dressing of the rod ends and an axially aligned alignment of the rods that are carried out, whereupon their dressed faces or cross-sectional surfaces are placed against one another and are pressurized. Whereby the two rod ends are moved in an oscillating manner in the opposite direction relative to one another, and frictional heat is generated on the contact surfaces. When the criteria for a metallic connection are met, the rod ends are axially aligned, such that the pressurization of the cross-sectional surfaces is increased and they are connected to one another over the entire surface.

The advantages obtained with the invention are that the oscillation amplitude of a rod end is reduced to approximately half of the degree of oscillation to be provided according to the method. The relative speed between the two friction surfaces is thereby essentially twice as high as the speed of the oscillation of the respective rod ends or cross-sectional surfaces. The invention provides the stress on parts of the friction welding device and the rod ends being reduced. Further, the invention provides the faces or axially normal cross-sectional surfaces remain essentially parallel at the ends of the rods through their oppositely directed bending and therefore ensure a virtually identical specific generation of frictional heat over the whole area. A material plasticization can thus be achieved and high connection quality established over the entire cross section of the two faces in their area close to the surface. The low oscillation speed and the like oscillation amplitude of the respective rod ends renders possible an axially aligned alignment of the rods that is simplified in implementation before the increased pressurization of the faces for creating the metal connection.

The present invention provides the relative movement between the rod ends that is carried out in a orbitally circulating or elliptical manner. Wherein the invention provides the accelerations and retardations to be avoided which are to be imposed with a linear oscillating movement of the rod ends. Furthermore, through an orbital movement, the energy input in the zones of the rods close to the cross-sectional surfaces is increased. The effect is because negative accelerations and stoppages relative to one another of the two friction surfaces do not occur in the oscillation cycle.

High-grade, quality-assured friction welded joints can be achieved if, during a fixing of the rods in respectively stationary holders, the two rod ends are bent in the opposite direction towards one another that are directed to moving elements and are moved in an orbital manner in the opposite direction at the same angular velocity. It is thereby advantageous if the two rods are respectively clamped in the stationary holders with essentially the same spacing from their faces or cross-sectional surfaces.

To avoid brittle hard areas in and/or close to the weld seam, which areas can have or initiate cracks, it can be provided that a heat treatment method of the rod ends is superimposed on the connection method of the same. Through such a method it is possible to establish an essentially homogenous, tough structure free of hardness peaks.

The invention is directed to a process for metallically connecting the faces of rods that includes axially normal dressing at least two rod free ends, placing the cross sectional surfaces of the rod free ends one against another under pressure, and oscillating the two rod free ends in the opposite direction to one another. In this manner, frictional heat is generated on the contact surfaces of the rod free ends. Further, when the conditions for a metallic connection are met, the rod free ends are axially aligned and the pressurization of the cross sectional areas is increased. Resulting in the rod free ends being connected to one another over the entire surface.

According to another feature of the invention, the process for the metallically connecting the rod free ends of the rods is by friction welding. Further, the rods are rails. Further still, the relative movement between the rod free ends is carried out in an orbitally circulating manner or an elliptical manner.

According to another feature of the invention, at least two rods are secured in at least one stationary holder. Further, the rod free ends of the two rods are respectively bent in the opposite direction by the moving devices and moved in an orbital circulating movement in the opposite direction at the same angular velocity. Further still, the two rods are clamped in at least one stationary holder axially aligned that have the same spacing from the respective rod free end cross sectional surfaces.

According to another feature of the invention, a heat treatment process of the rod free ends is superimposed on the process for metallically connecting the rod free ends of at least two rods.

The invention is directed to an apparatus for metallically connecting at least two elements. The apparatus includes a pressure device having at least two stationary holders structured and arranged to axially align the at least two elements, and to exert pressure between free ends of the elements. A moving device is structured and arranged to move the free ends in an oscillating manner in directions opposite one another while under pressure from the pressure device. The at least two elements can be rods. The at least two rods can be profiled rods, such that metallically connecting the rods can be by friction welding. the at least two rods can be at least two rails.

According to another feature of the invention, the moving device circulates in an orbitally circulating manner. Further, the moving device can circulate in an elliptical manner. Further still, the at least two rods are fixed in the stationary holder; and the rod free ends are bent in the opposite direction towards one another by the moving device. The at least two rods move in an orbital manner via the moving device in the opposite direction at approximately the same angular velocity.

According to another feature of the invention, the at least two rods are respectively secured in the stationary holder with approximately the same spacing from the respective cross sectional surfaces of the rod. Further, the moving device moves the free ends of the elements in an oscillating manner in an opposite direction to one another such that a frictional heat is generated on the free end surfaces. Further still, the pressure device applies pressure to the axially aligned elements and the elements are connected to one another over the entire cross sectional surfaces of the free end of the rods.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
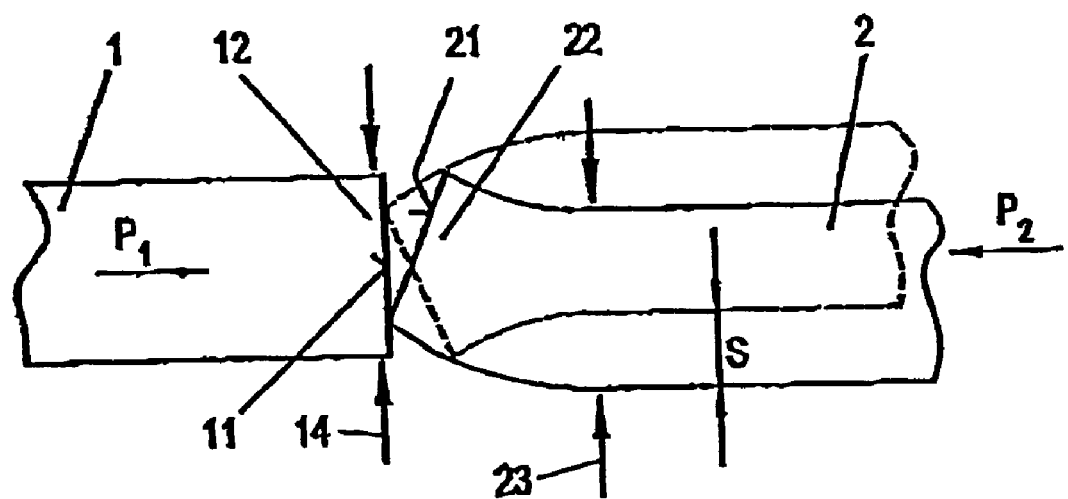
FIG. 1 Geometric development of a rod end during an oscillating friction movement of the prior art.

FIG. 1 shows a geometric development of a rod end 22 of a rod 2 moved in an oscillating manner. A rod 1 is kept stationary at one end 12 by a holder or clamping device 14 and provides a static cross-sectional friction surface 11. A rod 23, the end 22 of which performs an oscillating movement directed to moving elements 23 with an oscillation amplitude $S_1$ limiting is placed against the rod 1 with a pressurization $P_2$ directed against it. Bends of a moved free rod end 22 cause its face 21 to incline and cause it to rest against an opposite face 11 only in some areas, whereby frictional heat is generated only in these areas.

The prior art method represented in FIG. 1 has the disadvantage of a so-called "india rubber effect" and associated unstable friction-welded joints.

Figure 2:
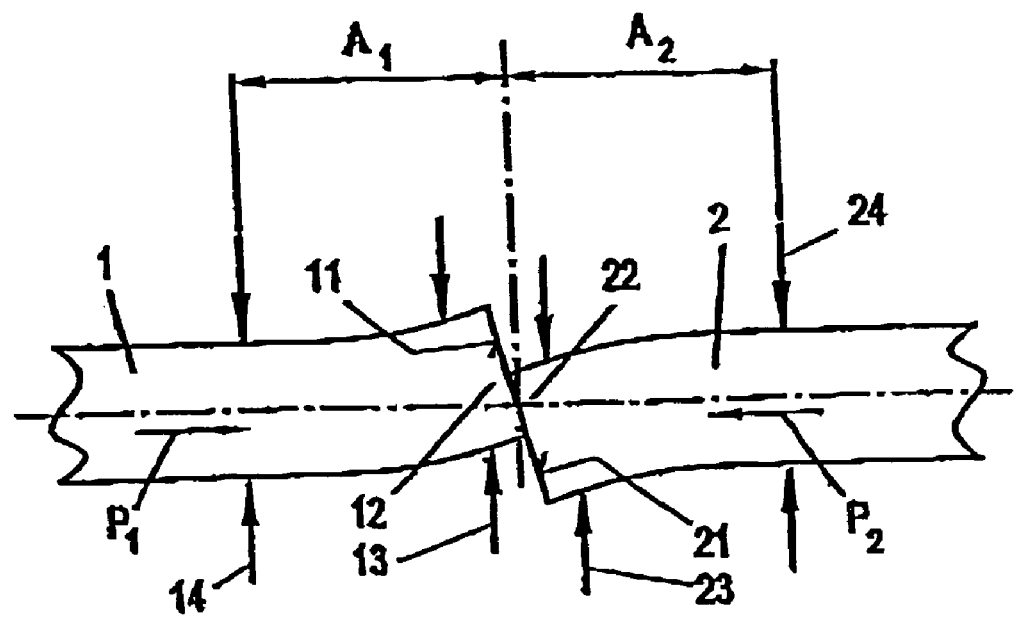
FIG. 2 Geometric development of the rod ends during their oscillating movement in opposite directions of the claimed invention.

The present invention shown in FIG. 2, discloses the ends 12, 22 of two rods 1, 2 that oscillate in an opposite direction relative to one another by moving elements 13, 23 with a vibration amplitude up to 4 mm. Further, an elastic bending of the ends 12, 22 occurs thereby, wherein the faces or cross-sectional surfaces 11, 21 of the rods 1, 2 are aligned with the axial normal and are inclined to the same degree $A_1$, $A_2$, but still respectively feature parallelism. Homogenously distributed friction heat can thus be input into the face areas of the rods 1, 2 via the frictional surfaces 11, 21 to an equal extent, whereby the highest quality of the metallic connection can be achieved. An approximately equal spacing $A_1$, $A_2$ of stationary holders 14, 24 of the rods to their faces 11, 12 promotes an input of frictional heat over the whole surface into the zone close to the faces of the rods 1, 2 and thus the quality of the friction-welded joint.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A process for metallically connecting the faces of rods comprising:
    axially normal dressing at least two rod free ends,
    placing the cross sectional surfaces of the at least two rod free ends one against another under pressure; and
    oscillating the at least two rod free ends in directions opposite one another, such that a bending of the at least two rod free ends occurs;
    whereby frictional heat is generated on the contact surfaces of the at least two rod free ends such that when the conditions for a metallic connection are met, the at least two rod free ends are axially aligned, the pressurization of the cross sectional areas is increased and the at least two rod free ends are connected to one another over the entire surface.

2. The process according to claim 1, wherein the rods are profiled rods.

3. The process according to claim 1, wherein the process for the metallically connecting the at least two rod free ends of the rods is by friction welding.

4. The process according to claim 1, wherein rods are rails.

5. The process according to claim 1, wherein the relative movement between the at least two rod free ends is carried out in an orbitally circulating manner.

6. The process according to claim 1, wherein the relative movement between the at least two rod free ends is carried out in an elliptical manner.

7. The process according to claim 1, wherein at least two rods are secured in at least one stationary holder, and the at least two rod free ends of the two rods are respectively bent in the opposite direction by the moving devices and moved in an orbital circulating movement in the opposite direction at the same angular velocity.

8. The process according to claim 1, wherein the two rods are clamped in at least one stationary holder axially aligned that have the same spacing from the respective rod free end cross sectional surfaces.

9. The process according to claim 1, wherein a heat treatment process of the at least two rod free ends is superimposed on the process for metallically connecting the at least two rod free ends of at least two rods.

10. An apparatus for metallically connecting at least two elements, the apparatus comprising:
    a pressure device having at least two stationary holders structured and arranged to axially align the at least two elements and to exert pressure between free ends of the at least two elements; and
    a moving device structured and arranged to move the free ends in an oscillating manner in directions opposite one another while under pressure from said pressure device such that a bending of the free ends occurs.

11. The apparatus in accordance with claim 10, wherein the at least two elements are rods.

12. The apparatus in accordance with claim 11, wherein the at least two rods are profiled rods.

13. The apparatus in accordance with claim 11, wherein for the metallically connecting of the rods is by friction welding.

14. The apparatus in accordance with claim 11, wherein the at least two rods are at least two rails.

15. The apparatus in accordance with claim 10, wherein said moving device circulates in an orbitally circulating manner.

16. The apparatus in accordance with claim 10, wherein said moving device circulates in an elliptical manner.

17. The apparatus in accordance with claim 11, wherein the at least two rods are fixed in said stationary holder; and the rod free ends are bent in the opposite direction towards one another by said moving device, such that the at least two rods move in an orbital manner via said moving device in the opposite direction at approximately the same angular velocity.

18. The apparatus in accordance with claim 11, wherein the at least two rods are respectively secured in said stationary holder with approximately the same spacing from the respective cross sectional surfaces of the rod.

19. The apparatus in accordance with claim 10, wherein said moving device moves the free ends of the elements in an oscillating manner in an opposite direction to one another such that a frictional heat is generated on the free end surfaces;
    said pressure device applies pressure to the axially aligned elements and the elements are connected to one another over the entire cross sectional surfaces of the free end of the elements.

20. A process for metallically connecting the faces of profiled rods comprising:
    axially normal dressing at least two profiled rod free ends,
    placing the cross sectional surfaces of the at least two profiled rod free ends one against another under pressure; and
    oscillating the at least two profiled rod free ends in directions opposite one another, such that a bending of the at least two profiled rod free ends occurs and the cross sectional surfaces remain essentially parallel through their oppositely directed bending;
    whereby frictional heat is generated on the contact surfaces of the at least two profiled rod free ends such that when the conditions for a metallic connection are met, the at least two profiled rod free ends are axially aligned, the pressurization of the cross sectional areas is increased and the at least two profiled rod free ends are connected to one another over the entire surface.

* * * * *